(12) United States Patent
Bosshart

(10) Patent No.: US 9,313,127 B2
(45) Date of Patent: Apr. 12, 2016

(54) ROTATE-MASK-MERGE AND DEPOSIT-FIELD INSTRUCTIONS FOR PACKET PROCESSING

(71) Applicant: Texas Instruments Incorporated, Dallas, TX (US)

(72) Inventor: Patrick W. Bosshart, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 245 days.

(21) Appl. No.: 14/025,177

(22) Filed: Sep. 12, 2013

(65) Prior Publication Data

US 2014/0219294 A1 Aug. 7, 2014

Related U.S. Application Data

(60) Provisional application No. 61/759,661, filed on Feb. 1, 2013.

(51) Int. Cl.
*H04J 3/00* (2006.01)
*H04L 12/56* (2006.01)
*H04L 29/12* (2006.01)

(52) U.S. Cl.
CPC ............ *H04L 45/741* (2013.01); *H04L 61/251* (2013.01); *H04L 61/6004* (2013.01); *H04L 61/6095* (2013.01)

(58) Field of Classification Search
CPC . H04L 45/741; H04L 61/251; H04L 61/6095; H04L 61/6004
See application file for complete search history.

(56) References Cited

U.S. PATENT DOCUMENTS

| | | | | | |
|---|---|---|---|---|---|
| 3,828,316 | A | * | 8/1974 | Card et al. | 711/219 |
| 5,781,457 | A | * | 7/1998 | Cohen et al. | 708/231 |
| 6,754,212 | B1 | * | 6/2004 | Terada et al. | 370/389 |
| 7,130,312 | B1 | * | 10/2006 | Amagai et al. | 370/469 |
| 2014/0219294 | A1 | * | 8/2014 | Bosshart | 370/476 |
| 2014/0241358 | A1 | * | 8/2014 | Bosshart et al. | 370/392 |
| 2014/0241359 | A1 | * | 8/2014 | Bosshart et al. | 370/392 |

OTHER PUBLICATIONS

Open Networking Foundation, "Openflow Switch Specification," Version 1.3.1 (Wire Protocol 0x04), Sep. 6, 2012, pp. 1-128.
Bao, et al., "IPv6 Addressing of IPv4/IPv6 Translators," Oct. 2010, pp. 1-18.

* cited by examiner

*Primary Examiner* — Robert Wilson
(74) *Attorney, Agent, or Firm* — John R. Pessetto; Frank D. Cimino

(57) ABSTRACT

In an embodiment of the invention, a method of performing a byte-rotate-merge on computer hardware is discussed. Byte-rotating is performed on first and second source operands and are byte-rotated by first and second rotation constants respectively. The first byte-rotate output and the second byte-rotate output are merged. Bytes from the first byte-rotate output are output to a byte-rotate-merge output when control bits from a byte-mask are logical ones. Bytes from the second byte-rotate output are output to a byte-rotate-merge output when control bits from the byte-mask are logical zeros.

1 Claim, 3 Drawing Sheets

ROTATE-MASK-MERGE AND DEPOSIT-FIELD INSTRUCTIONS FOR PACKET PROCESSING

This application for patent claims priority to U.S. Provisional Application No. 61/759,661 entitled "Rotate-Mask-Merge and Deposit-Field Instructions for Packet Processing" filed Feb. 2, 2013, which is incorporated by reference herein.

BACKGROUND

Computer hardware can intercept and log traffic passing over a digital network or part of a digital network. Computer hardware units which perform switching (often called "switches") of Ethernet packets, for example, have requirements for many kinds of functionality. One class of functionality is modifying packets, often based on matching the packet against an entry in a flow table. This match-action is part of the OpenFlow standard.

There are many types of packet manipulations which are useful, maybe even required functions, not specified by the OpenFlow standard. A desirable property of switches attempting to present a user model based on match-action is that they can perform general and diverse types of packet manipulations, so that they are capable of implementing the actions desired by the users programming these switches.

A high performance switch has limited time to process each packet. For example, a 64 port×10 Gbit per port switch has a total bandwidth of 640 Gb/sec. At a minimum Ethernet packet size of 64 bytes plus an interpacket gap of approximately 16 bytes, the maximum packet rate for such a switch is approximately 960M packets per second. A hardware packet processing pipeline running at 1 GHZ for example, sees one packet flowing through the pipeline every clock cycle (along with approximately 40 MHz of spare bandwidth). As a result, hardware which performs packet manipulations must either complete its function in a single clock cycle, or the hardware must be pipelined. In either case, hardware cannot be reused multiple times to do multiple computations for an individual packet. This makes it desirable to keep the packet manipulation hardware simple. Furthermore, there may be many copies of such hardware on an integrated circuit, providing further motivation to keep the hardware simple.

DETAILED DESCRIPTION

Figure 1A:
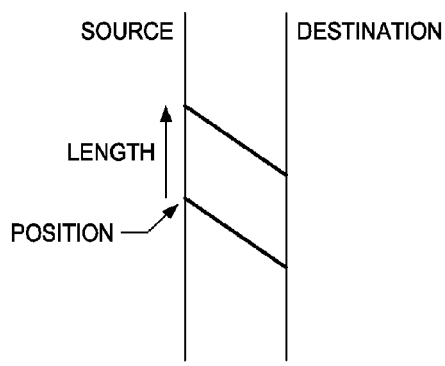
FIG. 1A is an illustration of an extract instruction that takes any length field from any position in the source operand and moves it down to bit 0 in the result. (Prior Art)

In one embodiment of an architecture for packet processing, where after a packet is parsed, header fields are deposited into a packet header vector consisting of a number of independent 8b, 16b and 32b data slots, each with an accompanying valid bit. The data in this packet header vector is sequentially sent to a number of match-action processing stages, where in each stage fields in the packet header vector may be used to match against table entries in the stage, and as a result of a match, an action may be specified which can modify the contents of the packet header vector. The action engine is a VLIW (Very Long Instruction Word) architecture, with a separate data processing unit for each independent data field in the packet header vector. An instruction which directs the operation of the action engine has a separate instruction field for each data slot of the packet header vector. An action is therefore composed of separate processing instructions for each slot of the packet header vector.

In an Ethernet packet which contains an IPV4 (Internet Protocol Version 4) header, the 32 bit IP (Internet Protocol) source and destination addresses would typically each get a 32b slot in the packet header vector, with the parser depositing the values in those slots as the result of parsing the packet. In an Ethernet packet which contains an IPV6 (Internet Protocol Version 6) header, the 128 bit IPV6 source and destination addresses would each be held in four 32 bit slots of the packet header vector.

128 bit IPV6 was introduced due to the impending exhaustion of the 32 bit address space of IPV4 addresses. One standard for translating addresses between IPV4 and IPV6 formats is given in Internet Engineering Task Force IETF RFC6052. It specifies a number of arrangements for translating addresses between IPV4 and IPV6, as shown by Table 1 below from RFC6052:

TABLE 1

IPV4-embedded IPV6 address formats

Big Endian:

```
+--+---+---+---+---+---+---+---+---+---+---+---+---+---+---+---+
|PL| 0-------------32--40--48--56--64--72--80--88--96--104--------|
+--+---+---+---+---+---+---+---+---+---+---+---+---+---+---+---+
|32|    prefix    |v4(32)       | u | suffix                     |
+--+---+---+---+---+---+---+---+---+---+---+---+---+---+---+---+
|40|    prefix    |v4(24)       | u |(8)| suffix                 |
+--+---+---+---+---+---+---+---+---+---+---+---+---+---+---+---+
|48|    prefix        |v4(16)| u |(16)  |suffix                  |
+--+---+---+---+---+---+---+---+---+---+---+---+---+---+---+---+
|56|    prefix              |(8)| u |  v4(24)   |suffix          |
+--+---+---+---+---+---+---+---+---+---+---+---+---+---+---+---+
|64|    prefix                    | u |  v4(32)     |suffix  |
+--+---+---+---+---+---+---+---+---+---+---+---+---+---+---+---+
|96|    prefix                                |  v4(32)  |
+--+---+---+---+---+---+---+---+---+---+---+---+---+---+---+---+
```

The table specifies a number of options for how an IPV6 address can represent an IPV4 address, using different length prefixes (PL in the table stands for prefix length). In the table, the u bits must be 0, and the suffix bits should also be 0. Given a known particular prefix length, it is possible to recover an IPV4 address from an IPV6 address, and given a prefix length and the prefix, it is possible to convert an IPV4 address to an IPV6 address. Of course, not all IPV6 addresses can be converted to IPV4 addresses, but if it is known that the IPV6 address was created from an IPV4 address in this way using a specific prefix length, it is possible to recover the IPV4 address.

Though the Table 1 above is specified in a big-endian format, when discussing hardware later on, little endian is preferred, where bit 0 is consistently the lsb (least significant bit). The above table is reproduced below in a little-endian representation:

TABLE 2

Little-endian IPV4-embedded IPV6 address formats

Little Endian:

```
+---+---+---+---+---+---+---+---+---+---+---+---+---+---+---+---+
|PL| 119---------95--87--79--71--63--55--47--39--31--23--15--7---|
+---+---+---+---+---+---+---+---+---+---+---+---+---+---+---+---+
|32|   prefix    |v4(32)     | u | suffix                        |
+---+---+---+---+---+---+---+---+---+---+---+---+---+---+---+---+
|40|   prefix    |v4(24)     | u |(8)| suffix                    |
+---+---+---+---+---+---+---+---+---+---+---+---+---+---+---+---+
|48|   prefix         |v4(16)| u |(16) |suffix                   |
+---+---+---+---+---+---+---+---+---+---+---+---+---+---+---+---+
|56|   prefix           |(8)| u | v4(24)  |suffix                |
+---+---+---+---+---+---+---+---+---+---+---+---+---+---+---+---+
|64|   prefix               | u | v4(32)      |suffix            |
+---+---+---+---+---+---+---+---+---+---+---+---+---+---+---+---+
|96|   prefix                              |   v4(32)   |
+---+---+---+---+---+---+---+---+---+---+---+---+---+---+---+---+
```

A 128 bit IPV6 address would be contained in an array of four 32b slots in the packet header vector, V6[3:0], with v6[3] containing the most significant 32b and v6[0] containing the least significant 32b, as shown below in Table 3:

TABLE 3

IPV6 packet header vector fields

```
     +---+---+---+---+---+---+---+---+---+---+---+---+---+---+---+---+
     | 119-111-103-95--87--79--71--63--55--47--39--31--23--15--7---|
     +---+---+---+---+---+---+---+---+---+---+---+---+---+---+---+---+
Word:|    V6[3]    |    V6[2]    |    V6[1]    |    V6[0]    |
Bits:|31         0|31         0|31         0|31         0|
     +---+---+---+---+---+---+---+---+---+---+---+---+---+---+---+---+
```

To perform IPV6 to IPV4 translation according to the specification, different sets of bits are pulled out of the IPV6 address and concatenated, for each choice of prefix length (PL), as shown in Table 4. Here signal<bh:bl> represents signal from the high bit bh (bit high) to the low bit bl (bit low). If these bits are a subset of the full bit width of the original signal, this notation can be considered as extracting the desired bit field from the original full signal. The symbol ":::" below represents concatenating two vectors, with the more significant vector on the left. For example, #xabcd::#xef is #xabcdef.

TABLE 4

IPV6 to IPV4 extract and merge operations

| PL | Function |
|---|---|
| 32 | v6<95:64> |
| 40 | v6<87:64> :: v6<55:48> |
| 48 | v6<79:64> :: v6<55:40> |
| 56 | v6<71:64> :: v6<55:32> |
| 64 | v6<55:24> |
| 96 | v6<31:0> |

If v6 IPV6 address fields in the above table are represented as their 32 bit packet header vector words V6[3:0], the operation becomes:

TABLE 5 extract and merge operations on packet header vector words

| PL | Function |
|---|---|
| 32 | v6[2]<31:0> |
| 40 | v6[2]<23:0> :: v6[1]<23:16> |
| 48 | v6[2]<15:0> :: v6[1]<23:8> |
| 56 | v6[2]<7:0> :: v6[1]<23:0> |
| 64 | v6[1]<23:0> :: v6[0]<31:24> |
| 96 | v6[0]<31:0> |

While for PL=32 or 96, no operation is necessary, for the other PL's two fields from different packet header vector words must be extracted and merged.

In this embodiment of the invention, the merge can be described as a sequence of two operations. In the first operation, the two data sources are each independently shifted into their correct final bit positions in the output word, and then in the second operation a mask chooses one or the other of these sources for each bit of the output (i.e. bitwise selection). By convention for this discussion, of the two sources, the first, will eventually form the more significant portion of the output, while the second will form the less significant portion of the output. The first source will be shifted left to align its bits into the correct output position, while the second source will be shifted right. The mask which chooses one source or the other has identical values for each bit in a byte, so it can be specified as a 4 bit vector, one bit for each byte, such as #b1110, meaning binary 1110. The interpretation of each mask bit is that if it is a 1, the first source is chosen, while if it is a 0, the second source is chosen. These operations can be represented by shift and mask operators. The shift operator syntax used is (shift data shift-amount) where the data is a 32b word, the shift-amount is in bytes, and the shift operator is shlb (shift left by a certain number of bytes) and is shrb (shift right by a certain number of bytes). The mask operator syntax is (mask mask-value source1 source2), where for these 32b numbers, the mask-value is 4 bits wide and the two sources are 32 bits wide. The shift and mask operations for each PL's computation are described functionally, in table 6:

TABLE 6 shift and mask operations

| PL | Function | Shift-mask operation |
|---|---|---|
| 32 | v6[2]<31:0> | |
| 40 | v6[2]<23:0> :: v6[1]<23:16> | (mask #b1110 (shlb v6[2] 1) (shrb v6[1] 2)) |
| 48 | v6[2]<15:0> :: v6[1]<23:8> | (mask #b1100 (shlb v6[2] 2) (shrb v6[1] 1)) |

TABLE 6-continued shift and mask operations

| PL | Function | Shift-mask operation |
|----|----------|---------------------|
| 56 | v6[2]<7:0> :: v6[1]<23:0> | (mask #b1000 (shlb v6[2] 3) (shrb v6[1] 0)) |
| 64 | v6[1]<23:0> :: v6[0]<31:24> | (mask #b1110 (shlb v6[1] 1) (shrb v6[0] 3)) |
| 96 | v6[0]<31:0> | |

Generally, a left or right shift performs a sign or zero extension on one end or the other of the input data word. That complication is unnecessary, since after the shift, none of the zero or sign extended bits are selected by the mask. So the shift can be replaced by a simpler rotate operation, rotlb (rotate left by a certain number of bytes), or rotrb (rotate right by a certain number of bytes), as shown in Table 7:

TABLE 7 rotate and mask operations

| PL | Function | rotate-mask operation |
|----|----------|----------------------|
| 32 | v6[2]<31:0> | |
| 40 | v6[2]<23:0> :: v6[1]<23:16> | (mask #b1110 (rotlb v6[2] 1) (rotrb v6[1] 2)) |
| 48 | v6[2]<15:0> :: v6[1]<23:8> | (mask #b1100 (rotlb v6[2] 2) (rotrb v6[1] 1)) |
| 56 | v6[2]<7:0> :: v6[1]<23:0> | (mask #b1000 (rotlb v6[2] 3) (rotrb v6[1] 0)) |
| 64 | v6[1]<23:0> :: v6[0]<31:24> | (mask #b1110 (rotlb v6[1] 1) (rotrb v6[0] 3)) |
| 96 | v6[0]<31:0> | |

Finally, it is recognized that a rotate left of a 32b source by a rotate count in bits is identical to a rotate right of that source by 32 minus the rotate count (modulo 32), or equivalently, a rotate left of a 32b source by a rotate count in bytes is identical to a rotate right of that source by 4 minus the byte rotate count, modulo 4. All the rotate functions can be changed to rotate in a single direction, as shown in Table 8:

TABLE 8

Rotate-right and mask functions

| PL | Function | rotate-mask operation |
|----|----------|----------------------|
| 32 | v6[2]<31:0> | |
| 40 | v6[2]<23:0> :: v6[1]<23:16> | (mask #b1110 (rotrb v6[2] 3) (rotrb v6[1] 2)) |
| 48 | v6[2]<15:0> :: v6[1]<23:8> | (mask #b1100 (rotrb v6[2] 2) (rotrb v6[1] 1)) |
| 56 | v6[2]<7:0> :: v6[1]<23:0> | (mask #b1000 (rotrb v6[2] 1) (rotrb v6[1] 0)) |
| 64 | v6[1]<23:0> :: v6[0]<31:24> | (mask #b1110 (rotrb v6[1] 3) (rotrb v6[0] 3)) |
| 96 | v6[0]<31:0> | |

This embodiment of the invention is called byte-rotate-merge. The hardware cost of this instruction will be discussed following the description of second inventive instruction which provides a general bit manipulation capability.

As an alternative implementation of the byte-rotate-merge embodiment, recognize that if the two source operands are equivalent and interchangeable, that is, both operands are capable of being sourced from the same inputs, the first source can be used as the one outputting to the more significant half of the output, the second source can be used as the one outputting to the less significant half of the output, and in those cases, for generating IPV4 addresses, the mask constant will always be a number of 1's in the more significant portion followed by a number of 0's in the less significant portion. The mask constant may then be alternatively coded in two bits as the position of the least significant 1. For the sake of generality, it is also possible to have a mask with a number of more significant 0's and less significant 1's, and alternatively encode the mask constant as the position of the least significant zero. These two approaches are logically equivalent so can be treated as the same approach. Equivalent to this is the encoding of the mask as the number of least significant bytes coming from the same source.

A second embodiment of the invention will now be discussed. It is common for processors to have an extract instruction, which performs the operation described earlier as extract; it takes a specific field from a full word, shifts it down to bit position zero, and clears (or sign extends) all bits above its defined length, as shown in FIG. 1A. For example sig<23:16> extracted from the 32 bit signal sig<31:0> is performed by right shifting the signal by 16 bits, and zeroing out all bits above the field length which in this case is 8 bits (from 23 to 16), so zeroing out bits 31 to 8. If extract is described as a function (extract data word lobit (low order bit) length) then the data is right shifted by lobit and all but the <length> bottom bits are zeroed (or sign extended). For example, (extract #x12345678 16 8) is #x34, bits <23:16> of the source data.

Figure 1B:
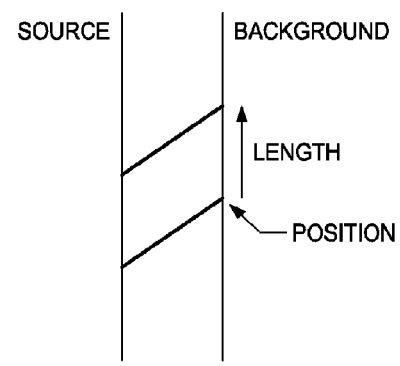
FIG. 1B is an illustration of a deposit-byte instruction that takes low order bits from a first source operand and replace a field of a second (background) source operand. (Prior Art)

A second prior art instruction is deposit-byte, where low order bits of a first source operand replace a field of a second (background) source operand, as shown in FIG. 1B. The field to be replaced in the second operand is defined by a high H and a low bit L, and the bits replacing that field are the lsb's of the first operand. The field has a width H−L+1. Encoding with low bit and length instead of high and low is equivalent. If the syntax for the deposit byte instruction is (deposit-byte source-data background-data position length) then (deposit-byte #x12345678 #xbbbbbbbb 16 8) is #xbb78bbbb; the bottom 8 bits of the first source operand #x12345678 have replaced bits <23:16> of the second (background) operand xbbbbbbbb.

Figure 1C:
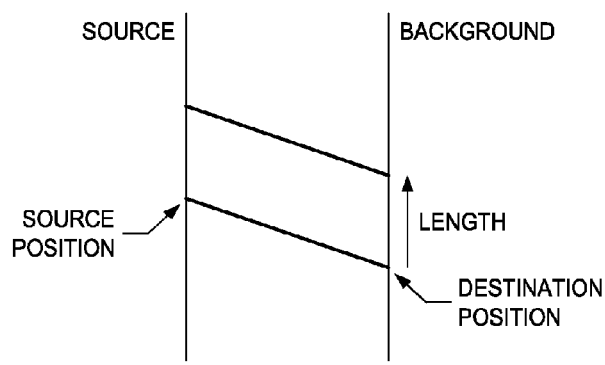
FIG. 1C is an illustration of deposit-field instruction that can take any length field from any place in the source operand and deposit it into any position in the background operand according to an embodiment of the invention.

The second embodiment of the invention provides more powerful and arbitrary bit manipulation capability. The extract instruction can take any length field from any position in the source operand and move it down to bit 0 in the result, as shown in FIG. 1A. A deposit byte instruction can take a destination field of any length at any position in a background operand and replace it with low order bits of the source operand, as shown in FIG. 1B. An embodiment of the invention provides a deposit-field instruction that can take any length field from any place in the source operand and deposit it into any position in the background operand, as shown in FIG. 1C.

The deposit-field instruction requires three shift constants, source position, destination position, and length, in addition to the source and background data operands. Alternative encodings of the three shift constants are possible and equivalent, for example using source position, destination position and destination high bit. This instruction differs from the conventional extract and deposit-byte instructions, which only require two shift constants, one position and a length. The deposit-field instruction provides a more generic capability to extract a field from anywhere and deposit it to anywhere. In the absence of this instruction, this generic operation would require a load-byte followed by a deposit-byte, two instructions, where the first instruction extracts the field to be deposited and the second deposits that field into the background word. Without the deposit-field instruction, the 4 operations of Table 8 with rotate and mask functional descriptions would all require two operations instead of one (except PL 56, where one rotate count is 0, and a deposit-byte instruction would work).

Figure 2A:
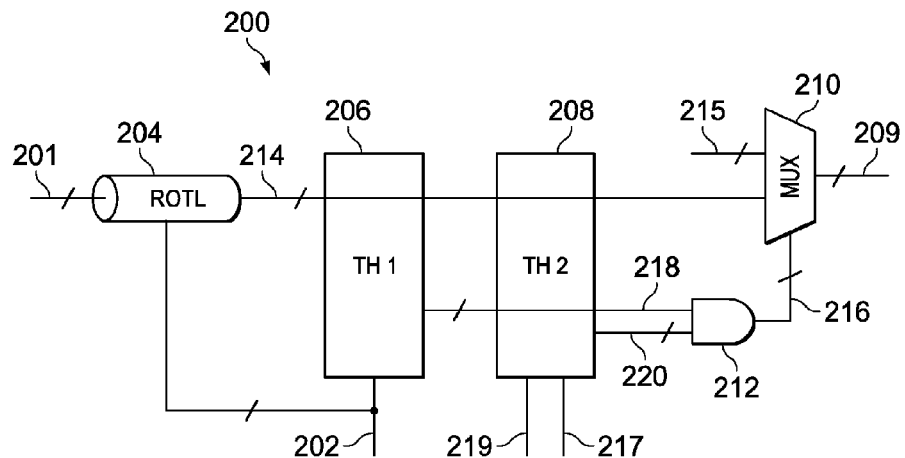
FIG. 2A is a block diagram illustrating deposit-byte hardware. (Prior Art)

The deposit-field instruction can be implemented with minimal additional cost compared with a conventional deposit-byte instruction. Conventional deposit-byte hardware 200 is shown in FIG. 2a. A rotator circuit 204 rotates the source argument 201 left by the value of the source position argument 202. The rotator argument 214 is selected instead of the background argument 215 by a multiplexer 210, where each bit of the multiplexer 210 is independently controlled (i.e. bit-wise selection). The rotator argument 214 is selected by the enable signal 216. The enable signal 216 is produced by performing a AND function 212 on the results 218 and 220 of two thermometer decoders 206 and 208 respectively, one of which enables bits from the source position argument 202 and higher while the other enables bits from the destination position argument 217 plus the length argument 219 and lower. The output of the multiplexer 210 is node 209.

Figure 2B:
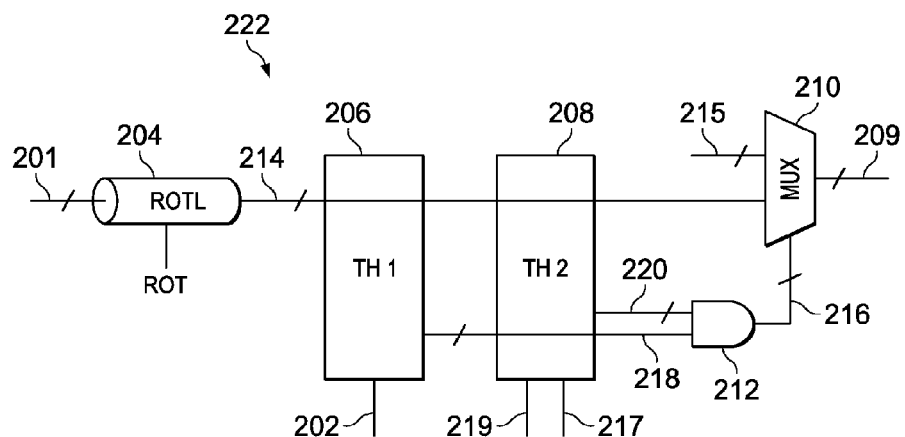
FIG. 2B is a block diagram illustrating deposit-byte hardware according to an embodiment of the invention.

FIG. 2b shows the hardware 222 required to implement a deposit-field instruction according to an embodiment of the invention. The rotator count is changed from the source position argument 202 to a new rotate argument ROT. The ROT argument is equal to destination-position minus source-position (for a rotator which rotates left by the rotate count argument). Note that since all shift constants are simply constants, they can use alternate encodings to reduce complexity, recognizing that ultimately three 5 bit constants are required. One can specify the rotate count, a second destination-position, and a third position+length. As a result, no hardware is required to add or subtract the shift constants. No additional datapath hardware is required over deposit-byte for the deposit-field instruction, with the only change being that the rotator is controlled by a new, additional argument ROT.

Figure 3A:
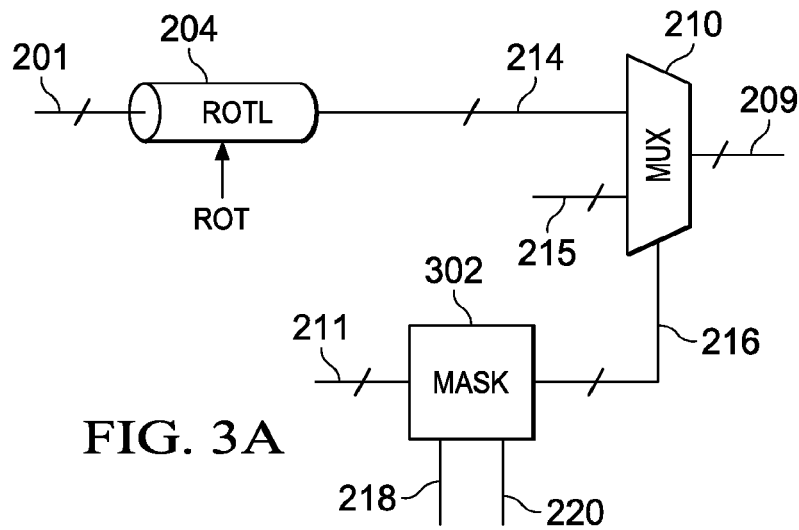
FIG. 3A is a block diagram illustrating deposit-field hardware according to an embodiment of the invention.
Figure 3B:
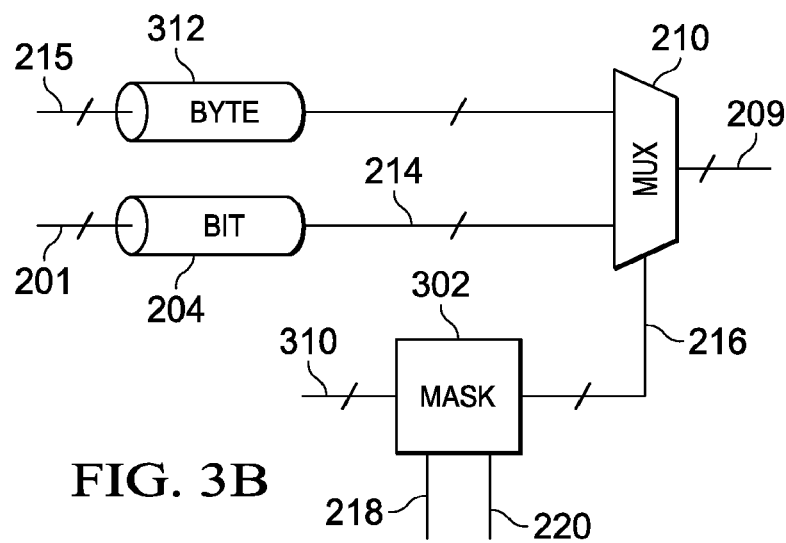
FIG. 3B is a block diagram illustrating hardware for implementing a byte-rotate-merge operation according to an embodiment of the invention.

The additional cost of implementing the byte-rotate-merge instruction can be understood by examining the simplified deposit-field schematic of FIG. 3a. Here the controlling logic for the control signal 216 of the multiplexer 210 has been consolidated into a mask block 302 with the results of two thermometer decoders 218 and 220 being feed into mask block 302. FIG. 3b shows the enhancements required for implementing byte-rotate-merge as well. The background data 215 now has a byte rotator 312 between it and the multiplexer 210. The mask block 302 has an additional input, byte-mask 310, which controls the multiplexer 210 selects on a per-byte basis for byte-rotate-merge instructions. The output 209 in FIG. 3b is the byte-rotate-merge output. The byte rotator 312, for example a 32 bit 4 input multiplexer, is the main added hardware, along with some small additional logic to control the mask block 302. Note that the added rotator 312 is a byte rotator, rotating by only 0, 8, 16, or 24 bits, while the previously existing rotator is capable of rotating by all 32 bit positions.

The foregoing description has been presented for purposes of illustration and description. It is not intended to be exhaustive or to limit the invention to the precise form disclosed, and other modifications and variations may be possible in light of the above teachings. The embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A method of performing a deposit-field instruction on computer hardware the method comprising:
  receiving a source argument and a background argument;
  receiving a destination position argument, a source position argument and a length argument;
  rotating the source argument by a ROT argument wherein the ROT argument is equal to the destination position argument minus the source position argument resulting in an byte-rotate output;
  applying the source position argument to a first thermometer decoder wherein an output of the first thermometer enables bits from the source position argument and higher;
  applying the destination position argument plus the length argument to a second thermometer wherein an output of the second thermometer enables bits from the destination position argument plus the length argument and down;
  applying the output of the first thermometer and the output of the second thermometer to a AND gate wherein an output of the AND controls a multiplexer;
  wherein a result of the deposit-field instruction is completed in a single clock cycle.

* * * * *